US007933681B2

(12) United States Patent
Maitino

(10) Patent No.: US 7,933,681 B2
(45) Date of Patent: Apr. 26, 2011

(54) POSTAL PRESORTING USING AN OCCURRENCE TABLE

(75) Inventor: Philip M. Maitino, Laguna Niguel, CA (US)

(73) Assignee: Melissa Data Corp., Rancho Santa Margarita, CA (US)

( * ) Notice: Subject to any disclaimer, the term of this patent is extended or adjusted under 35 U.S.C. 154(b) by 780 days.

(21) Appl. No.: 11/857,998

(22) Filed: Sep. 19, 2007

(65) Prior Publication Data

US 2008/0077272 A1 Mar. 27, 2008

Related U.S. Application Data

(60) Provisional application No. 60/847,353, filed on Sep. 25, 2006.

(51) Int. Cl.
*G06F 7/00* (2006.01)
*G06F 17/00* (2006.01)
*G07B 17/02* (2006.01)
*G06K 9/00* (2006.01)

(52) U.S. Cl. ........ 700/224; 700/223; 700/213; 700/219; 705/406; 705/401; 209/583; 209/584

(58) Field of Classification Search .................. 700/223, 700/224; 209/583, 584
See application file for complete search history.

(56) References Cited

U.S. PATENT DOCUMENTS 5,072,401 A * 12/1991 Sansone et al. ............... 700/219
5,377,120 A 12/1994 Humes et al.
5,475,603 A * 12/1995 Korowotny .................. 700/213
5,774,885 A * 6/1998 Delfer, III ..................... 705/401
5,841,658 A * 11/1998 Bouchard ..................... 705/406
2004/0002925 A1* 1/2004 Gordon ......................... 705/401
2005/0119786 A1* 6/2005 Kadaba ......................... 700/224
2006/0080266 A1* 4/2006 Kiani et al. .................. 705/402
2008/0162381 A1* 7/2008 Runstrom et al. ............ 705/402

* cited by examiner

*Primary Examiner* — Gene Crawford
*Assistant Examiner* — Yolanda Cumbess
(74) *Attorney, Agent, or Firm* — Fish & Associates, PC

(57) ABSTRACT

A computer system utilizes an algorithm that: (a) prepares a table that includes counts of zip code occurrences in a mailing list; (b) prepares a container list that allocates counts to different containers; (c) uses the container list to allocate individual addresses to different mailing containers; and (d) addresses the mailing pieces (directly or by labels) according to the addresses associated with the various containers. Such configurations can advantageously decrease the time required to sort an extremely large mailing into mailing containers according to postal presort levels, among other things by performing the above steps predominantly in the internal memory of the computer system.

13 Claims, 4 Drawing Sheets

200

260

| Address | ZIP Code |
|---|---|
| 204 Oak Dr | 20000 |
| 100 Main St | 10000 |
| 208 Oak Dr | 20000 |
| 210 Oak Dr | 20000 |
| 200 Oak Dr | 20000 |
| 206 Oak Dr | 20000 |
| 108 Main St | 10000 |
| 102 Main St | 10000 |
| 104 Main St | 10000 |
| 106 Main St | 10000 |
| 202 Oak Dr | 20000 |

210

250A

| ZIP Code | Count |
|---|---|
| 10000 | 5 |
| 20000 | 6 |

220

250E

| Container | ZIP Code | Count |
|---|---|---|
| 1 | 10000 | 4 |
| 2 | 20000 | 4 |
| 3 | 10000 | 1 |
| | 20000 | 2 |

230

250F

| Address | ZIP Code | Container |
|---|---|---|
| 204 Oak Dr | 20000 | 2 |
| 100 Main St | 10000 | 1 |
| 208 Oak Dr | 20000 | 2 |
| 210 Oak Dr | 20000 | 2 |
| 200 Oak Dr | 20000 | 2 |
| 206 Oak Dr | 20000 | 3 |
| 108 Main St | 10000 | 1 |
| 102 Main St | 10000 | 1 |
| 104 Main St | 10000 | 1 |
| 106 Main St | 10000 | 3 |
| 202 Oak Dr | 20000 | 3 |

240

FIG. 2

POSTAL PRESORTING USING AN OCCURRENCE TABLE

This application claims priority to Provisional App. No. 60/847,353 filed Sep. 26, 2006.

FIELD OF THE INVENTION

The field of the invention is postal presorting.

BACKGROUND

Both merchants and mailing list services maintain customer databases, which they use to print addresses for mailing pieces. As these lists become large, the impact of postal rates can be enormous. In general bulk mailing postal rates are dependent upon the amount of presorting that is done prior to delivery of the mail to the post office. Postal presorting is a process where a mailing list of names and addresses is arranged in such a way as to reduce the amount of work needed to be done by the post office to handle that mail.

Presort discounts are related to the number of mail pieces addressed with the same, or similar, zip code classifications. The amount of postage discount available varies with the level of zip code classification, the greatest discount being for carrier route (pieces delivered by the same mail carrier in a single zip code, then for five digit zips, then for three digit zips (first three digits of a zip code are the same), then for Area Distribution Centers (abbreviated "ADC" and referring to offices serving multiple three digit zips), and finally for mixed ADCs a catch all for mail pieces that don't have sufficient quantities to qualify at one of the higher levels. These zip code classifications are known as presort levels. In order to achieve postage discounts for presorting, the mail is presented in containers such as trays, which must be arranged in such a way so as to contain appropriate quantities of mail for the various presort levels.

It is known to use computer systems to create a mailing based on presort discounts, by sorting each physical mail pieces. U.S. Pat. No. 5,475,603 to Korowotny (December 1995) teaches a system that scans the zip codes on individual mail pieces (by optical character recognition) to determine the quantities of mail that qualify for a presort level discount. One significant drawback is that Korowotny's system is only practical with a sequential, or at least almost sequential, mailing list. Even there, Korowotny's system works well for relatively short list. When a mailing is large, sorting individual pieces becomes too time intensive.

A better strategy is to sort a mailing list rather than the printed items. U.S. Pat. No. 5,377,120 to Humes et al. (December 1994) teaches a system that aggregates the mailing lists of a plurality of merchants, and groups the addresses according to the lowest presort level rates. However, such a system typically takes several hours to sort a 10 million address list into presort levels, mostly because the computer must use a disk-based algorithm during the sortation.

Korowotny, Humes and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

In view of the shortcomings of the prior art, there is still a need for systems, methods and apparatus that decrease the overall time required for a computer system to presort a mailing list into presort level discounts.

SUMMARY OF THE INVENTION

The present invention provides apparatus, systems and methods in which a computer system utilizes an algorithm that: (a) prepares a table that includes counts of zip code occurrences in a mailing list; (b) prepares a container list that allocates counts to different containers; (c) uses the container list to allocate individual addresses to different mailing containers; and (d) addresses the mailing pieces (directly or by labels) according to the addresses associated with the various containers.

Such configurations can advantageously decrease the time required to sort an extremely large mailing into mailing containers according to postal presort levels, among other things by performing the above steps predominantly in the internal memory of the computer system.

Preferred occurrence tables typically include counts of five digit zip codes, but can also include counts of addresses at a presort level more detailed than five digit zip codes, such as carrier routes, or at a presort level less detailed than five digit zip codes such as counts of addresses where the first three digits of the zip code are the same.

Preferred container lists comprise the algorithm creating the minimum number of mailing containers for a mailing while at the same time maximizing the greatest presort level discount per mail piece. Preferred algorithms exhaust at least 50% (but more preferably at least 60%, at least 70%, at least 80%, at least 90%, and most preferably 100%) of all possible single five digit zip code containers from the counts in the occurrence table, and then exhausts at least 50% (but more preferably 100%) of all possible single three digit zip code containers according to the counts in the occurrence table. Additionally, the algorithm utilizes a minimum and a maximum container capacity to prepare the container list.

Preferred mailing containers can be any standard mailing trays, but can alternatively be sacks, pallets, or any other suitable containers. The mailing containers can include individual containers for carrier routes, five digit zip codes, three digit zip codes, Area Distribution Centers (ADCs), and for mixed ADCs.

Preferred systems can advantageously print addresses directly on the individual mailing pieces, without having to perform a sortation function. If the printing takes place on a container by container basis, the physical mail pieces can then be placed directly in the respective containers without any further sorting. Additionally, preferred systems can place container identifiers directly on the labels or individual mailing pieces.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWING

FIG. 2 is a block diagram illustrating an exemplary configuration or method of a postal presort system utilizing an algorithm of the present invention.

DETAILED DESCRIPTION

Figure 1:
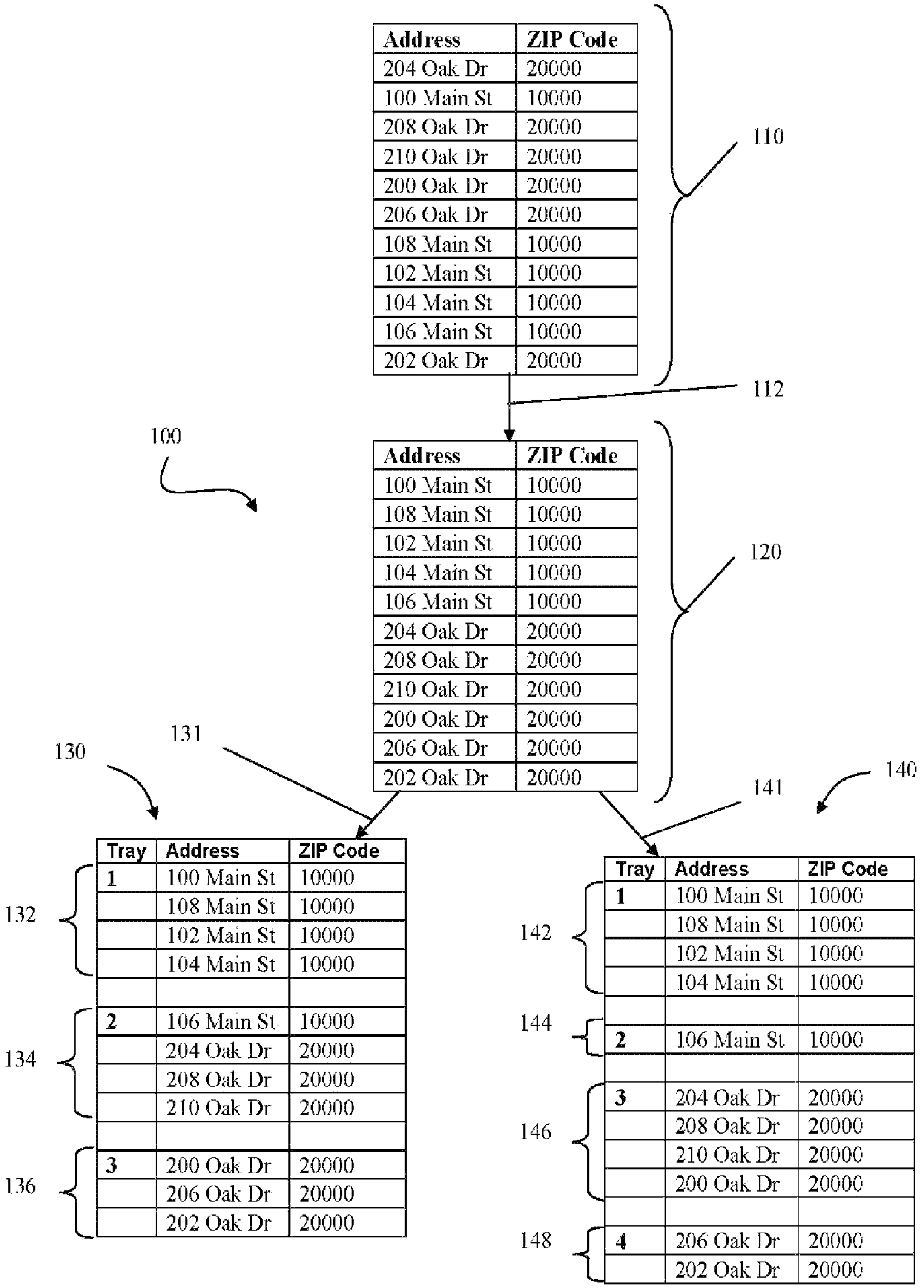
FIG. 1 (Prior Art)
FIG. 1 is a block diagram illustrating the steps of a method of a prior art postal presort system.

FIG. 1 is a block diagram illustrating the steps of a method 100 for sorting of address records. In the first step, a sorting algorithm 112 sorts a potentially random set of records 110 by zip code to produce a sorted list 120. The records are deemed to be "potentially random" because the system can take as input any list having any degree of randomness. In this and all other examples given herein, it should also be appreciated that the few lines of data can represent "n" records, where n is likely thousands or even millions of records.

There are two options to allocate the sorted records to mailing containers to obtain postal presort discounts. In one option 130, an algorithm 131 slavishly runs down the sorted list 120, establishing container breaks whenever a maximum container capacity is reached. In this example, the breaks produce containers separated into groups 132, 134, and 136.

In the other option 140, an algorithm 141 still runs down the sorted list 120, but does a better job of allocating addresses to produce full containers with a given zip code. For example, the algorithm 141 leaves container 144 only partially filled so that it can fill container 146 entirely with addresses having a 20000 zip code. There is no impact on container 142, but some of the addresses that would have gone into container 148 are included in container 146, and the addresses from container 144 might eventually be combined with those in container 148.

This type of prior art sorting system works reasonably well for lists that are maintained in reasonably zip code sorted order, and where there are so many addresses per zip code that the allocation among containers is straightforward.

FIG. 2 illustrates an exemplary inventive configuration or method of a postal presort system 200 utilizing an algorithm 250A, E, and F, having a possibly random address list 210, a zip code occurrence table 220, and a mailing container list 230.

In this particular example, address list 210 is depicted as having an address column and a zip code column. For simplicity purposes, address list 210 is depicted as having only 11 entries. However, it is contemplated that address list 210 can have any number of entries with any number of different zip codes.

In FIG. 2, algorithm 250A examines address list 210 (which can have any degree of randomness) with a hard drive read operation to create the zip code occurrence table 220 having a zip code column and a zip code count column. Zip code count column typically includes counts of zip codes at a five digit zip code presort level, but could also include counts of addresses at a presort level more detailed than five digit zip codes, such as carrier routes (zip+4), or at a presort level less detailed than five digit zip codes such as, three digit zip codes, Area Distribution Centers (ADCs), and mixed ADCs.

One significant factor is that the entire operation can be performed with no hard drive writes at all. This makes for much faster operation.

In a subsequent step, algorithm 250E uses data in the occurrence table 220 to create container list 230, which is prepared according to postal presort levels, the counts in the occurrence table, and a minimum and a maximum container capacity. The container capacity, of course, depends among other things upon the weight and thickness of the mail pieces. In FIG. 2, container list 230 is depicted as having a container column, a zip code column, and a zip code count column.

In order to create container list 230, algorithm 250E tries to create full containers with the highest presort level, which presently is a carrier route within a single five digit zip code. With remaining counts, the algorithm then tries to create full containers with the second highest presort level, which presently is a single five digit zip code. The system then tries to allocate counts to create full containers with third level presort, fourth level presort, and so forth.

Thus, if there are not enough mail pieces left over to fill another container with a single five digit zip code presort level having a minimum capacity, then an additional level of sorting must be done. This level of sorting involves grouping mail pieces from multiple surrounding areas. Hence, algorithm 250E creates all possible mailing containers having the same first three digit zip code. It is contemplated that algorithm 250E continues to create mailing containers until all counts in occurrence table 220 are used in the container list 230. In addition, Algorithm 250E maximizes the presort level discount per mail piece by optimizing the minimum number of mail containers that need to be created in container list 230 according to postal presort level discounts.

Those skilled in the art will appreciate that when optimizing a presort, the system may need to "borrow" from a higher presort level to promote a group of mail pieces in a lower presort level. For example, where a mail container holds between 375 (minimum) and 500 (maximum) pieces, it might be advantageous to move one member from a group of 500 mail pieces at a five digit zip code presort level, to a group of 374 mail pieces are at an ADC presort level, thus bumping that second group up to a three digit zip code presort level.

For simplicity purposes, FIG. 2 assumes a minimum tray size of 3 mail pieces and a maximum tray size of 4 mail pieces (or 300 and 400 mail pieces if each record is thought to represent 100 pieces). As algorithm 250E examines occurrence table 220, the first mailing container is created with a single five digit zip code (10000) and the occurrence table is decremented for the four mail pieces associated with container 1. Next, algorithm 250E examines occurrence table 220 for the next highest presort level that (a) contains a full mailing container or (b) that contains at least the minimum number of mail pieces to qualify as a container. The second container is created with a single five digit zip code (20000) and the occurrence table is decremented for the four mail pieces associated with container 2. Once again, algorithm 250E examines occurrence table 220 for the next highest presort level that qualifies as a container and the third and final mail container is created having mixed zip codes (10000 and 20000) that qualify as a mixed ADC, the lowest presort level.

In a still later step, algorithm 250F re-scans address list 210 and creates a modified address list 240, as shown by FIG. 2, by associating individual addresses in the mailing list to the corresponding mailing containers of the container list.

Of course, in all of these discussions, mailing containers can be any suitable continuers, including standard mailing trays, sacks, pallets, and so forth. Individual mailing containers can be used for any presort level, including carrier routes (zip+4), five digit zip codes, three digit zip codes, Area Distribution Centers (ADCs), and mixed ADCs.

Figure 3A:
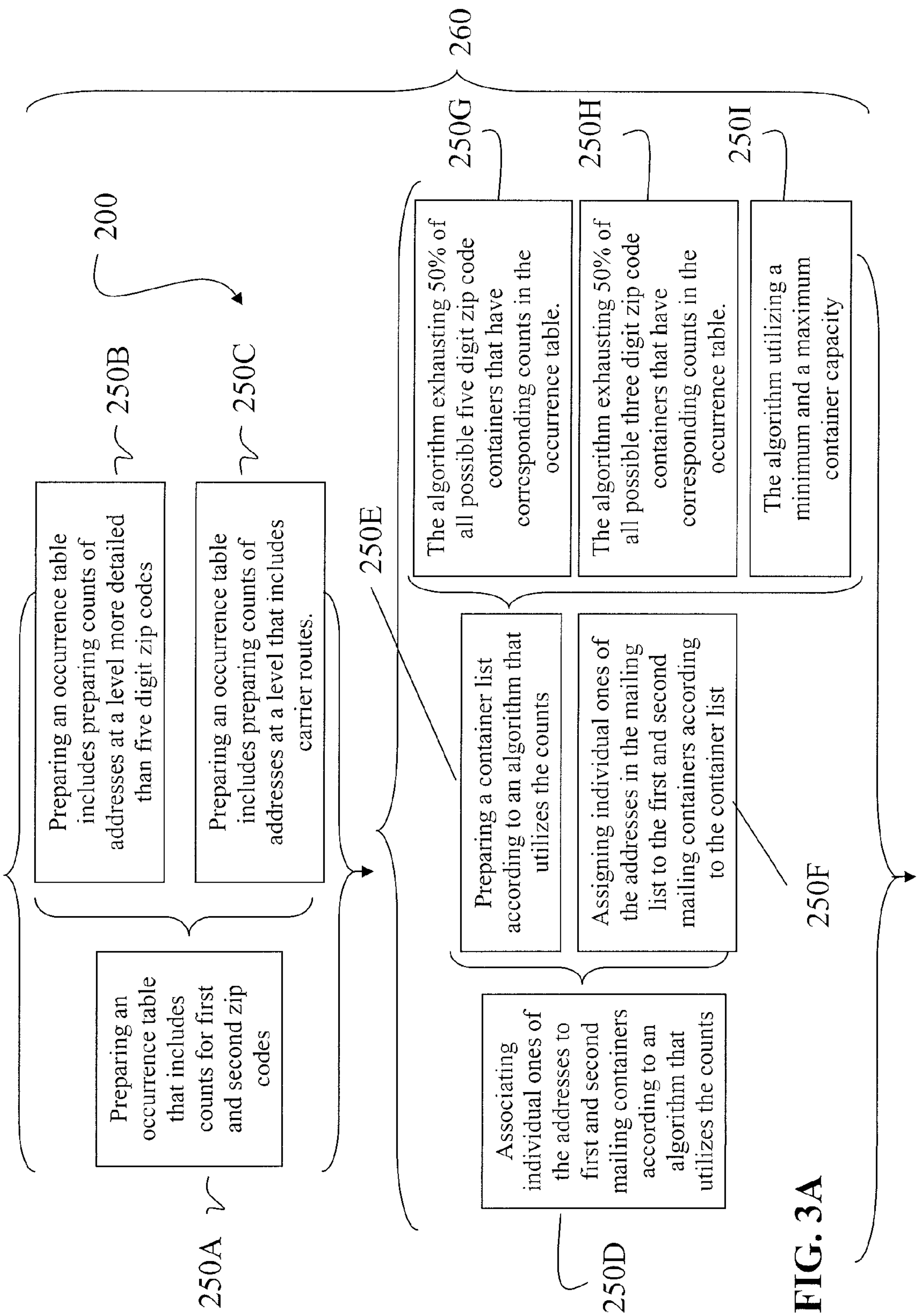
FIG. 3 is block diagram illustrating the exemplary configuration or method of a postal presort system of FIG. 2.
FIG. 3B continues the flow path of FIG. 3A.
Figure 3B:
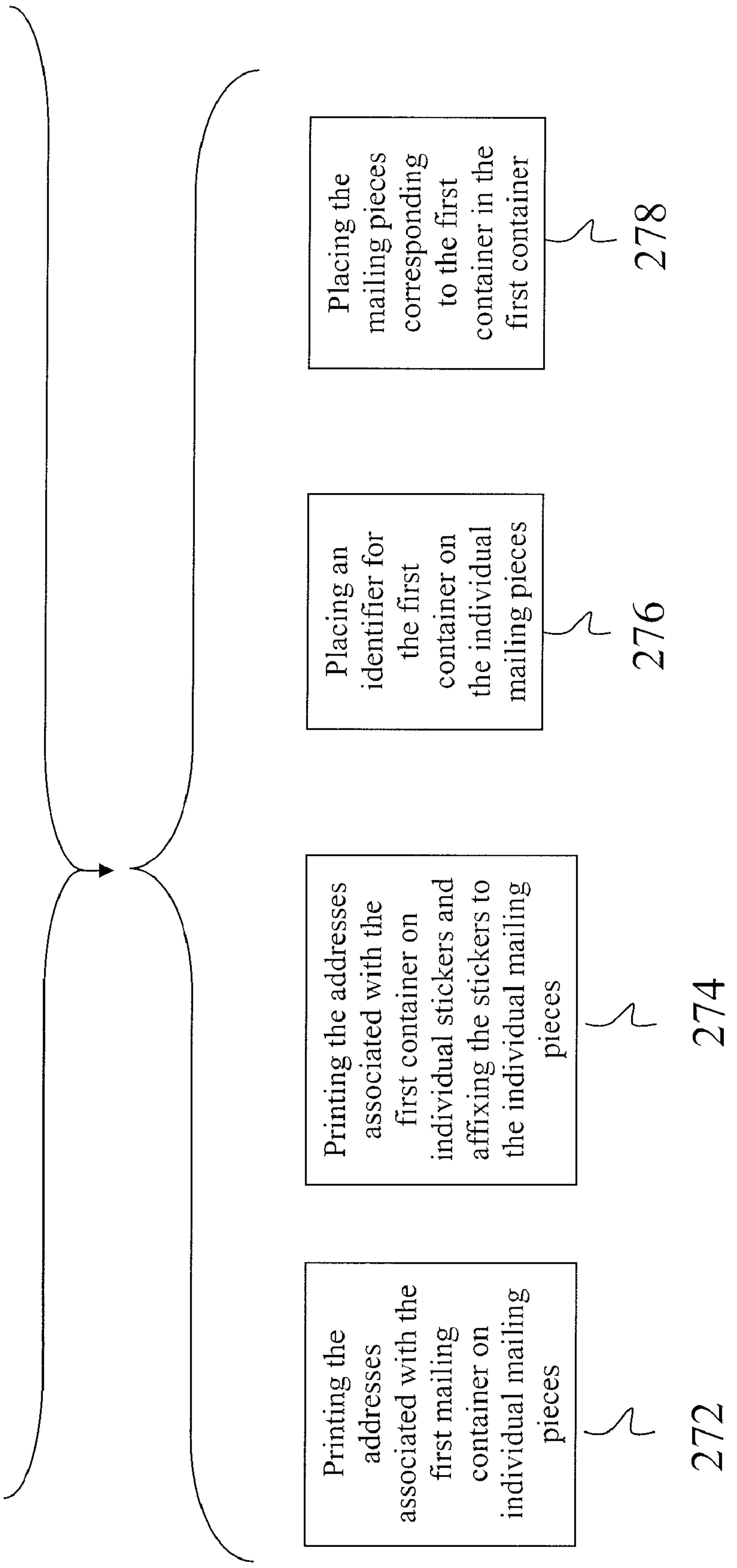

FIG. 3 depicts the postal presort system 200, which can execute any realistic combination of steps/algorithms, designated as 250A, 250B, 250C, 250D, 250E, 250F, 250G, 250H, and 250I. Such combination of steps/algorithms can advantageously decrease the time required to sort an extremely large mailing into mailing containers according to postal presort levels, among other things by performing the above steps predominantly in the internal memory 260 of the postal presort system 200. Additionally, presort system 200 can preferably perform optional steps 272, 274, 276, and 278.

In general then, it is possible to speed up the process of postal presorting by preparing zip code counts, using the counts to allocated addresses, and then to go back to the hard drive or other data source to allocate actual addresses to specific containers based upon the allocated counts. Much of this process can be performed in internal memory, but in any event without sorting in external storage. Current algorithms can only sort about 5000 mail pieces in the same amount of RAM due to hard drive write operations, but embodiments of the present invention have no practical limit on the number of address records.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of allocating addresses in a mailing list to maximize a postal presort discount, comprising:

preparing an occurrence table from an address record that includes counts for first and second zip codes before generation of mail pieces;

then associating individual ones of the addresses to first and second mailing containers according to an algorithm that maximizes the postal presort discount by optimizing the minimum number of containers as a function of the counts;

then printing addresses on the mail pieces corresponding to the first and second containers; and distributing the mail pieces into the corresponding first and second containers.

2. The method of claim 1, wherein the step of preparing an occurrence table includes preparing counts of addresses at a level more detailed than five digit zip codes.

3. The method of claim 1, wherein the step of preparing an occurrence table includes preparing counts of addresses at a level that includes carrier routes.

4. The method of claim 1, wherein the step of associating further comprises preparing a container list according to an algorithm that utilizes the counts.

5. The method of claim 4, wherein the step of associating further comprises assigning individual ones of the addresses in the mailing list to the first and second mailing containers according to the container list.

6. The method of claim 4, wherein the step of preparing a container list further comprises the algorithm exhausting 70% of all possible five digit zip code containers that have corresponding counts in the occurrence table.

7. The method of claim 4, wherein the step of preparing a container list further comprises the algorithm exhausting 90% of all possible three digit zip code containers that have corresponding counts in the occurrence table.

8. The method of claim 4, wherein the step of preparing a container list further comprises the algorithm utilizing a minimum and a maximum container capacity.

9. The method of claim 1, further comprising placing the addresses associated with the first container on individual mailing pieces, and placing the mailing pieces in the first container.

10. The method of claim 9, further comprising placing the addresses associated with the first container on individual stickers, affixing the stickers to individual mailing pieces, and placing the pieces in the first container.

11. The method of claim 9, further comprising placing an identifier for the first container on the mailing pieces to be placed in the first container.

12. The method of claim 1, wherein at least some of the containers are standard mailing trays.

13. The method of claim 1, further comprising performing the steps of claim 1 at least predominantly in an internal memory.

* * * * *